United States Patent [19]

Mensick

[11] Patent Number: 5,716,149
[45] Date of Patent: Feb. 10, 1998

[54] ERGONOMICALLY IMPROVED STANDARD KEYBOARD

[76] Inventor: John Mensick, 4743 McHenry Gate Way, Pleasanton, Calif. 94566

[21] Appl. No.: 47,633

[22] Filed: Apr. 13, 1993

Related U.S. Application Data

[63] Continuation of Ser. No. 780,935, Oct. 23, 1991, abandoned.
[51] Int. Cl.$^6$ .................................................. B41J 5/10
[52] U.S. Cl. ................................ 400/489; 400/486
[58] Field of Search .............................. 400/489, 488, 400/486

[56] References Cited

U.S. PATENT DOCUMENTS

807,556  12/1905  Hotson ........................... 400/489

*Primary Examiner*—Edgar S. Burr
*Assistant Examiner*—Anthony H. Nguyen
*Attorney, Agent, or Firm*—Baker & McKenzie

[57] ABSTRACT

A keyboard which integrates ergonomic modifications, but which overcomes the psychological resistance to changing existing, familiar designs. The positions of the keys are determined with reference to the natural positions of the fingertips in the typing position and the geometric relationships between keys. The keyboard layout is based upon consideration of the relative positions of the bases of the fingers and where they meet the hand, the relationship between the bases of the fingers and the wrist, and the natural orientation of the fingertips. The creation of groups of keys allows ergonomic adjustment of the keys, while preserving much of the geometry of a standard keyboard. In particular, these ergonomic modifications are applied to the standard geometry of the "Qwerty" or "Dvorak" keyboard.

1 Claim, 6 Drawing Sheets

ERGONOMICALLY IMPROVED STANDARD KEYBOARD

This is a continuation of U.S. patent application Ser. No. 07/780,935, filed Oct. 23, 1991, now abandoned.

BACKGROUND AND SUMMARY OF THE INVENTION

This invention relates to keyboards for computer input devices, typewriters, and other machines designed to make use of the manual input of linguistic and numerical information.

Heretofore, ergonomic improvements to keyboard design have taken an extremist approach, emphasizing one or another quality the designer felt was the essence of perfection in this field At first, this approach was an argument as to which of the basic adjustments was most important. Later, the idea of perfection evolved into the inclusion of every possible modification, the argument then being which combination of elements would achieve the "ultimate" ergonomic keyboard design.

From the beginning there have been numerous attempts to define just what particular ergonomic aspects were the most important. In general, this investigation revealed four main areas of concern, namely: character organization, curve, key grouping, and arm/hand alignment. The inclusion, approach, or combination of these concerns made up the underlying premise for each keyboard design, and identified it's weakness as well.

However, the marketplace is also an arbiter of design, especially in the area of keyboard development. In this field, vitally all keyboards in the marketplace consist of the same design, namely five parallel, horizontal rows with specific vertical key offsets, and the characters in the familiar "QWERTY" pattern. Though the character organization may differ, as in the alternative "Dvorak" arrangement (U.S. Pat. No. 2,040,248), the geometrical relationship between keys remains the same, constituting what can be generally referred to as the "standard keyboard". Despite all ergonomic influence and resultant designs, this standard keyboard makes up well over 99% of the keyboards in the world today.

For this reason, the development of a truly useful ergonomic keyboard must not only include the lessons of previous ergonomic developments, but must also include—and be tempered by—an understanding of the reasons behind the popularity of the standard keyboard. Without the incorporation of this understanding, any ergonomic development will inevitably become a mere theoretical study, as virtually all alternative designs have been to date, no matter how ergonomically perfect they claimed to have been. This is because psychological amenability is also a requirement of ergonomic design, and therefore must be respected. In the case of keyboards, this means ergonomic adjustment as a modification and improvement of the existing standard, rather than the creation of radically new designs which seek engineering perfection, but sabotage their efforts by ignoring the psychological fears of the user. The most ergonomic keyboard, therefore, is the one that is actually used.

Fortunately, the source of the popularity of the standard keyboard is not difficult to determine once a broader perspective than keyboard ergonomics is sought. The very nature of the devices keyboards have been attached to have usually been oriented towards serious work of one kind or another, and this fact is the foundation of the tenacious resistance people have shown towards change in keyboard design.

When people's livelihoods, or a business's profits, are directly connected with the design of a mechanism, there is usually great resistance to changing that which works, no matter how poorly it may accomplish it's function. Usually a combination of factors, including at the very least significant functional improvement and a favorable cost-benefit ratio, not to mention a significant increase in the pleasure of use, are required before any change is made in a vital piece of equipment. The more vital the equipment, the greater the resistance to change and the more prone to standardization, and the greater the benefit required before a new design can be accepted.

Keyboards have always been crucial to whatever their respective task has been. In typewriters, keyboards represented virtually the only way to get words into type, and the ability to do so in an efficient and accurate manner was the very livelihood of millions of people. In the case of computer input terminals this position of importance (and the number of people involved) was multiplied many times, for the universal applicability of computers meant that professionals of many more areas of concern were now also dependent for their livelihoods on the control of this new machine, control which they commanded solely through the use of a keyboard.

Therefore from the beginning the keyboard has filled a psychologically demanding role for those who have used it, and the sheer number of these users have made standardization virtually mandatory. Likewise, it is simply a matter of history that the standard keyboard with the QWERTY key arrangement was the earliest, and strongest, keyboard standard. As is explained many times in other patents and ergonomic studies, the QWERTY pattern of keys was actually designed to slow typists down so as to provide a typing speed amenable to the mechanical functioning of early typewriters, which jammed if used too rapidly. As is also explained in other patents, the geometry of the standard keyboard leaves much to be desired in the realm of typing physiology and ergonomics. Yet the solution of these patents has unanimously been to reject outright the standard keyboard in favor of more ergonomic designs, without understanding the reason for the massive psychological dependency already in place, against which any new keyboard design would ultimately have to compete.

The four major areas of ergonomic modification as stated above render themselves difficult to incorporate into the standard keyboard geometry without effectively erasing that geometry. In past keyboard designs, each ergonomic topic, whether character organization, curve, key grouping, or arm/hand alignment, has been done without sufficient consideration for the adverse effects of reorganization of the geometry of the standard keyboard. However, if the standard geometry is to be respected, these topics must be treated in a much more rigorous and unilaterally integrated way in order to fit into the narrow confines of the standard geometry. This precision of this rigor transforms the nature of each ergonomic topic into substantially new topics altogether, just as tolerance levels in any design process differentiate entire fields of endeavor even though those fields may share common origins. Especially relevant to this distinction is the determination of the exact aspects of the hands and arms which are most pertinent to keyboard ergonomics, while precisely integrating this data into a keyboard design which continues to maintain the geometry of the standard keyboard.

Several patents discuss ergonomic keyboard adjustment strategies. They include the following U.S. Pat. Nos:
556,422

1,138,474
1,200,439
1,652,464
1,678,334
3,698,532
3,945,482
4,244,659
4,579,470
4,824,268

These patent show designs which are fundamentally disassociated from the standard keyboard. U.S. Pat. No. 4,669,903 retains as it's link only the five horizontal rows (the least ergonomic link of all) and changes both the geometrical key relationships and hand integration, thus rejecting and divorcing itself from the recognizable geometry of the standard keyboard. Therefore all of the ergonomic keyboard designs heretofore known suffer from a number of disadvantages. They ignore the fundamental importance of integrating standard keyboard geometry with ergonomic modification, and therefore make no effort to do so. They also do not describe in either a neuro-physiologically or statistically viable fashion exactly which aspects of the hands may be measured to produce data pertinent to the integrated ergonomic adjustment of the keys of a standard keyboard. Finally, they do not describe in what fashion the keys of the standard keyboard may be safely adjusted without disrupting the geometry of the standard keyboard.

Accordingly, the present invention provides several objects and advantages.

One is to provide a keyboard which includes as a primary design requirement that all ergonomic keyboard modifications be integrated with an obvious and functional similarity to the geometry of the standard keyboard.

Another is that it provides a keyboard which includes in it's design the incorporation of a new assumption of the neuro-physiology of the arms, hands and fingers of a typist.

Still another is that it provides a keyboard based upon an analytical methodology by which the keys of the standard keyboard may be grouped and moved according to a variety of ergonomic needs without excessive deviation from the geometry of the standard keyboard.

Further objects and advantages of my invention will become apparent from a reading of the following specification in conjunction with the accompanying drawings.

DESCRIPTION OF AN EMBODIMENT OF THE PRESENT INVENTION

Figure 1:
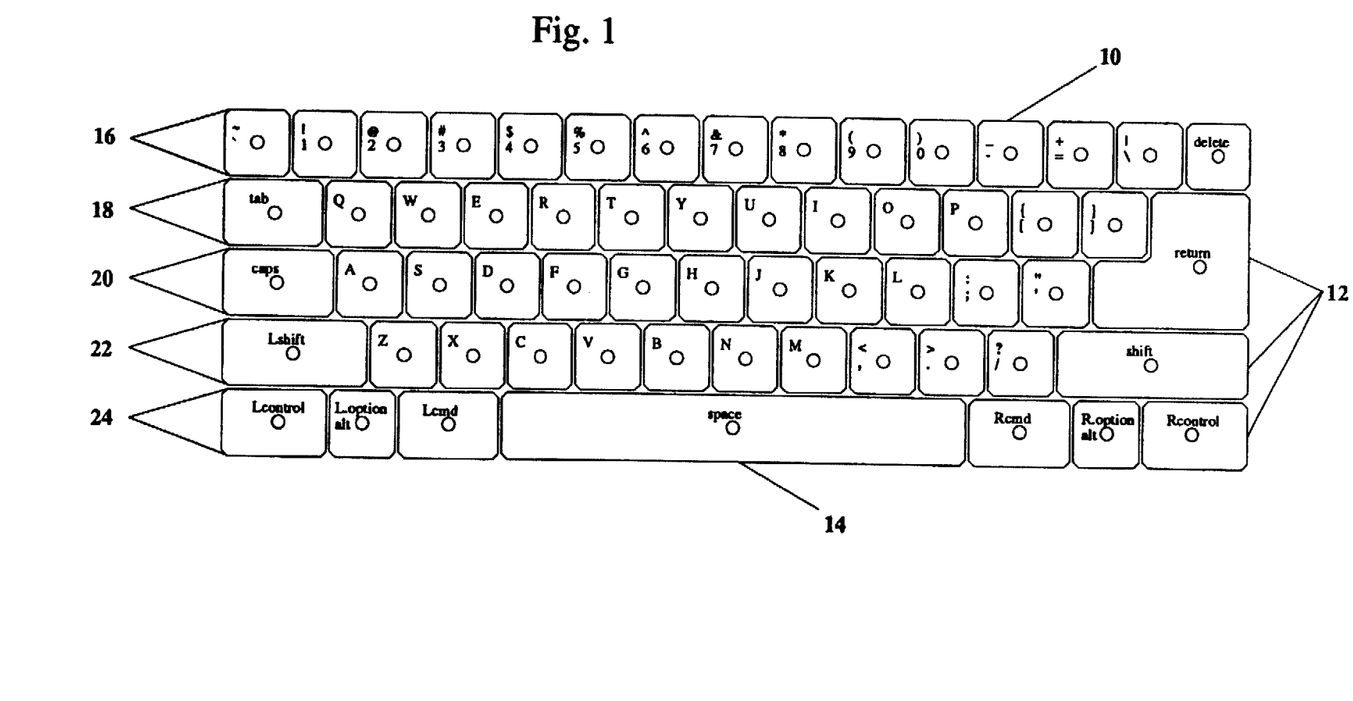
FIG. 1 is a plan view of a typical full standard keyboard.

The improved keyboard is the result of specific modifications to an original standard keyboard. This original keyboard is in common use, and an example is illustrated in FIG. 1. For clarity, the generally accepted geometrical design of the standard keyboard will first be described in order to provide a foundation for understanding the geometry of the improved keyboard. However, while the ergonomic modifications of the present invention are most likely to be applied to the standard keyboard, it must be noted that these ergonomic modifications may be applied to many other keyboard designs as well.

The keys 10 of the standard keyboard are generally identical in shape and size, except for the outer function and modifier keys 12 which are usually horizontally elongated in order to give the complete standard keyboard a generally rectangular appearance.

The standard keyboard generally consists of a main alphanumeric body of at least three, but usually five, parallel, horizontal rows of keys (FIG. 1). Each of the three middle rows 18, 20, 22 normally includes a sequence of alphabetical and grammatical characters (such as the QWERTY or Dvorak sequence), usually bordered on the end of each row by modifier or function keys of some sort. The lowest row of keys 24, positioned closest to the typist and immediately under the lower of the middle three main rows, is generally made up of modifier or function keys on either end of a long spacebar 14. The highest row of keys 16, positioned farthest from the user above the upper of the middle three main rows, is generally made up of numerical keys with modifier or function keys on either end of the row.

While the horizontal rows 16, 18, 20, 22, 24 of the standard keyboard are usually aligned without deviation, the vertical alignment of the keys is usually staggered, and it is this specific juxtaposition of horizontal and vertical key relationships which make up the geometry of the standard keyboard (FIG. 1). In particular, the reference for the vertical alignment shift is generally the homerow, or middle row 20. The row 22 immediately beneath the homerow, generally the lower alphabetical row, is usually organized in such a way that the keys of this row have their midpoints oriented in vertical alignment with or near the space between the keys of the homerow 20. The row 18 immediately above the homerow, generally the upper alphabetical row, is usually organized in such a way that the keys of this row have their midpoints oriented in vertical alignment with or near the left one-third vertical divider of the keys of the homerow 20. Finally, the row 16 immediately above the upper alphabetical row, which is the row above the homerow, is usually organized in such a way that the keys of this row have their midpoints oriented in vertical alignment with or near the space between the keys of the row 18 immediately beneath them.

This general key relationship is the essence of what is usually referred to as the standard keyboard geometry (FIG. 1). And while the specific organization of the alphanumeric characters assigned to the keys of such a keyboard may vary, this does not effect the geometrical description of the keyboard, or it's applicability to the modifications of the improved keyboard.

Figure 2:
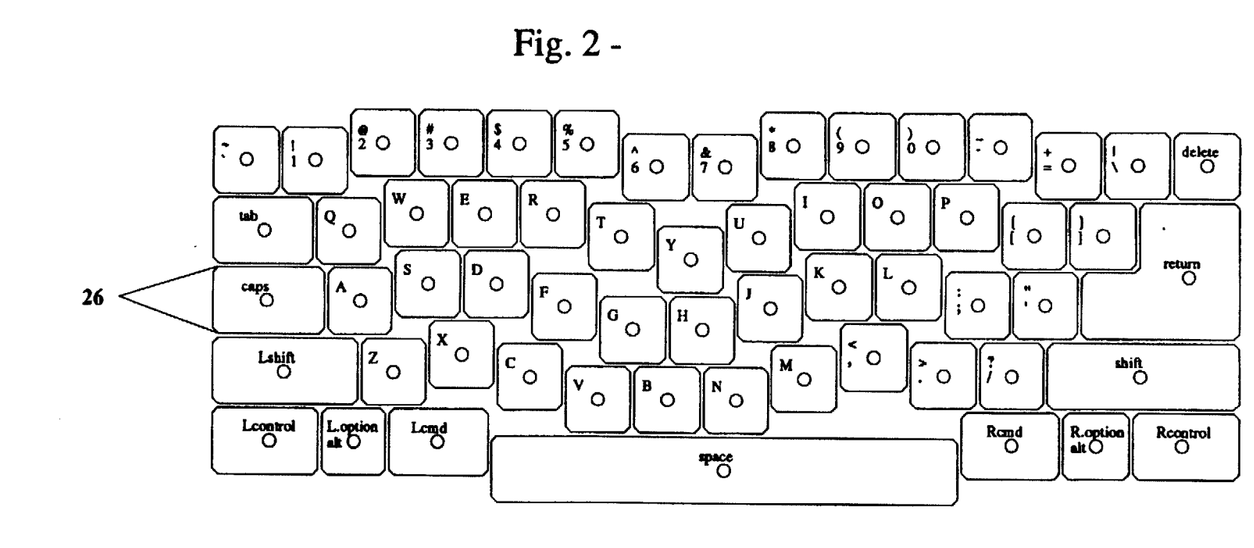
FIG. 2 is a plan view of an ergonomically improved keyboard made in accordance with the present invention.

The foundation of the improved keyboard, one variation of which is shown in FIG. 2, is the idea of preserving the geometrical relationships between the keys of the standard keyboard while repositioning of groups of keys into a more ergonomic arrangement. Such positioning can include the alignment of keys with an ergonomically adjusted homerow 26, and/or in a way more easily reached by their assigned fingers, and/or to fit the natural, relaxed typing position of the body.

It must be stressed that the requirement of respecting the innate key geometry of the standard keyboard (FIG. 1), or any original keyboard, puts limits on the degree of possible ergonomic adjustment; the improved keyboard is therefore not the most ergonomically perfect arrangement of keys, but rather that arrangement which incorporates the most ergonomic improvement while still preserving the general geometry of the standard keyboard.

The outer eight keys of the homerow are the traditional rests for the typing fingers, and as such play a fundamental role in any ergonomic keyboard improvement. It is vital the geometry of these keys be as accommodating as possible to the natural, relaxed position of the fingers in the rest typing position. Therefore the basis for appropriate ergonomic adjustment is the proper orientation of the homerow keys to a curve based on appropriate data, all other ergonomic adjustments being subsidiary to this one.

In times past, the ergonomic adjustment of the homerow keys has been approximated around the length of the fingers or the general curve formed by the extended fingertips. However, there has been little understanding about the psycho-physiology of typing in these modifications, and thus no way was provided to determine which aspects of the hand could be measured to provide relevant data for the correct adjustment of the homerow keys, so that they actually correspond to the natural positions of the fingertips in the typing position. Due to the importance of these keys, it is crucial that there be some way to determine their precise placement.

Only by understanding that the natural rest positions of the typing fingers are a function of the way the brain coordinates the movements of the fingers through space is it finally possible to gain insight into the appropriate measurement of the hand. When relaxed, it is theorized that the fingers naturally bend inward so that the tips of the fingers closely follow those points the brain uses as the axis of their movement. In this way the brain expends the least possible amount of energy in keeping track of the fingertips by "zeroing out" their positions in it's coordinate frame of reference. Therefore, through observation and measurement, a new theory of the neuro-physiology and bio-mechanics of typing is here introduced, whereby the natural rest positions of the fingertips in the typing position is said to correspond with the points where each finger is joined to the hand. Further, since the wrist is the base of the hand and the link with the geometry of the arms, it is used as the reference point required to measure the relative length of each finger's base position.

Figures 3, 4:
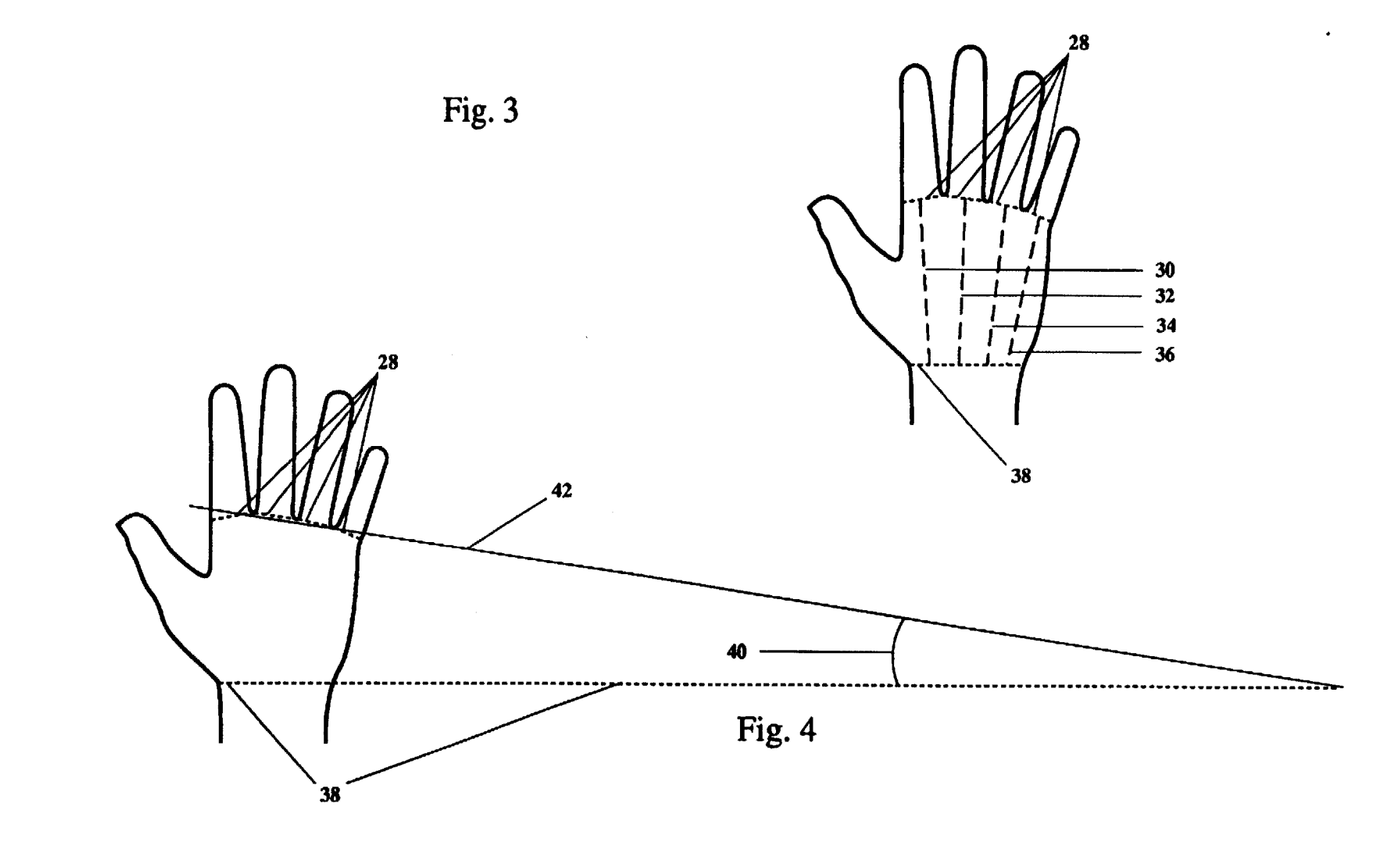
FIG. 3 is a schematic diagram showing the relationship between the wrist and bases of the fingers.
FIG. 4 is a schematic diagram showing how the angle between the wrist and the fingerbase is derived.

The parameters by which an original keyboard may be adjusted according to the above theory is illustrated in FIGS. 3 and 4. Accordingly, the most natural and ergonomic position of the fingers in the typing position is proposed to correspond to the relative relationships of the base of the fingers where they join the hand 28. The brain is seen as using the base of the fingers as the zero-point of the coordinate axis it uses to identify the position of each finger in space. This theory is used to determine two separate ergonomic data-sets, which are then integrated to form a final determination of the precise natural positions of the fingers in the typing position for any statistically measurable population. The respective data for either hand is seen as interchangeable.

The first data-set (FIG. 3), which determines the relative positions of the naturally bent and relaxed fingertips, is seen to correspond to the relative measurements of the distances 30,32,34,36 between the line of the wrist 38 and the base of each finger where it joins the hand 28. This first data-set is theorized to closely approximate the exact positions in which the brain places the tips of each finger of a hand bent into the typing position.

The second data-set (FIG. 4), which determines the approximate angle required to bend the arms and bring the hands together over the keyboard, is seen to correspond to the relative angle 40 formed between the averaged straight line 42 drawn through the base of the fingers, and the line of the wrist 38. This second data-set is theorized to closely approximate the exact angle which the brain rotates the arms in order to bring the hands together in a natural, relaxed typing position.

Therefore the second data-set is used to adjust the data of the first data-set, integrating both into a close approximation of the locations of the fingertips when the hands are brought together in a natural and relaxed typing position over a keyboard.

Figures 5A, 5B:
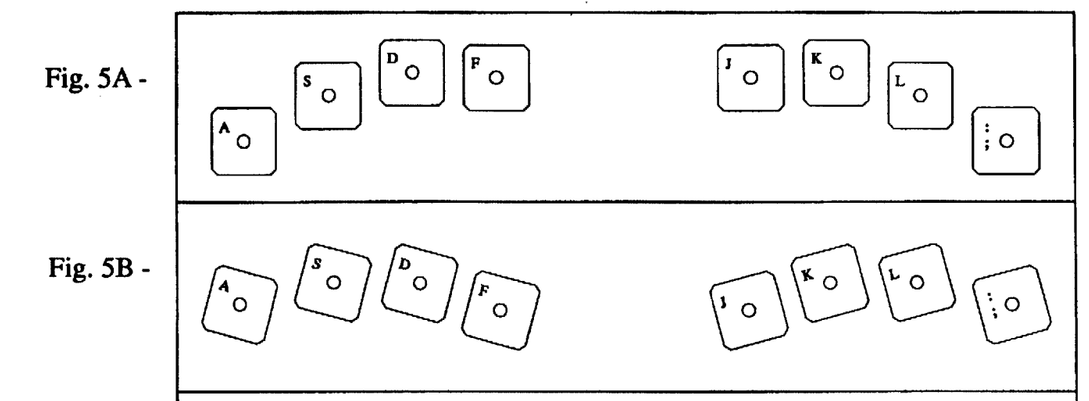
FIG. 5A through 5D are successive plan views of a homerow of keys showing how an orientation of the keys in accordance with the present invention is derived.

Once the relative fingerbase measurements are used to create initial positions for the homerow keys (FIG. 5A), two other modifications are generally necessary to complete the integration of ergonomic data into the homerow key positions.

Figure 5C:
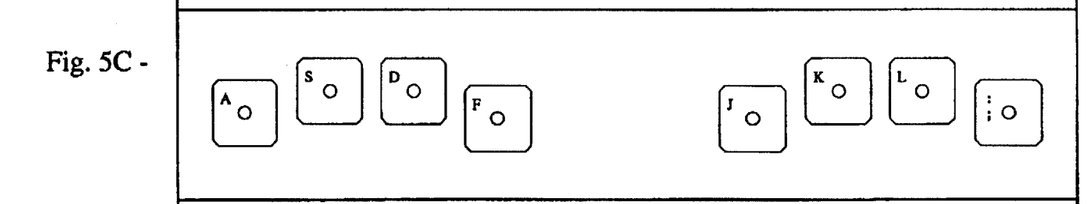

The first modification is the use of the fingerbase data to calculate the angle at which the homerow keys of each hand need to be rotated inward as a group (FIG. 5B) in order to accommodate the inward orientation of the arms when the hands are brought together over the keyboard. This angle is theorized to closely approximate the angle formed by comparing the line of the wrist with a best-fit straightedge drawn through a graph of the plot of the fingerbase data for each hand, as explained above. This enables the brain to make use of the above described data-points in it's orientation of the arms as well, minimizing the energy demands required to calculate the position of the arms, hands and fingers in space. Each keycap is then reoriented back to the vertical position (FIG. 5C) for alignment with the rest of the keyboard, though this step is modifiable, given the ergonomic demands of a given implementation.

Figure 5D:
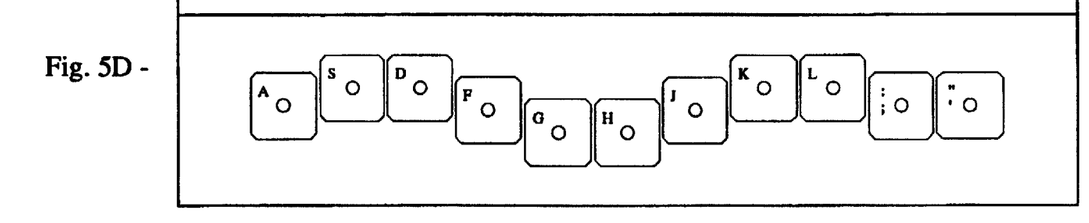

The second modification is the extrapolation of the data to fit the non-rest keys of the homerow, and thus complete the homerow proper (FIG. 5D). This extrapolation may be done according to a variety of methods, including statistical calculation and the observation of the natural range of movement of the fingers from their rest positions.

After the proper modification of the homerow has been determined, whether by the above means or some other, respect for the geometry of the original keyboard (whether it be the described standard keyboard or some other) requires a method by which the keys of the keyboard can be ergonomically adjusted without destroying their basic geometry. It is this concern for the preservation of the key geometry of the original keyboard, which may also be coupled with the option of the above-specified homerow adjustment, which sets this ergonomic keyboard design apart from all others.

The method by which the original key geometry is preserved is the creation of logical key groups, within which the spatial geometry between the keys is unchanged from their original relationship. The ergonomic adjustment of the keyboard is thus derived from the re-adjustment of these groups, rather than the reorientation of individual keys. In this way the dual needs of original geometry preservation and ergonomic optimization are reconciled in the simplest possible way.

Figure 6A:
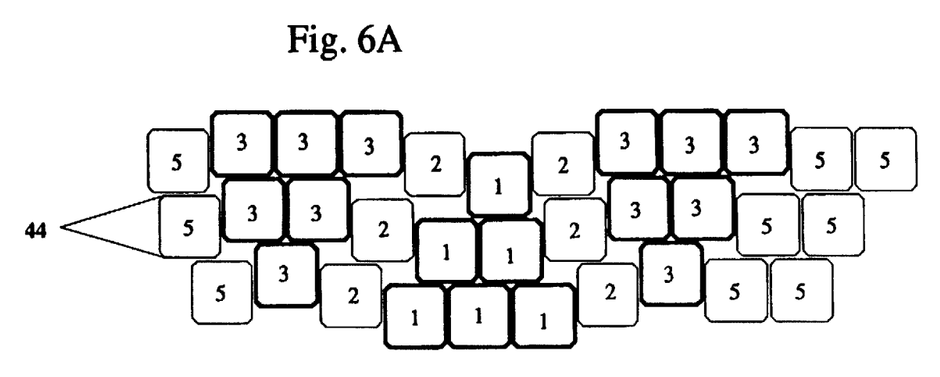
FIG. 6A through 6C are plan views of groups of keys arranged in accordance with the present invention.

Accordingly, the groups are created in such a way as to approximate the closest-fit to the homerow key fingerassignments while still approximating the ergonomic adjustment of the homerow. This grouping is accomplished in three logical steps. First, the eight rest position keys together with non-rest position keys adjacent thereto (i.e. the "g" and "h" keys) make up the homerow are all considered homerow keys. Second, the keys assigned to each finger are logically grouped with their designated homerow key. And third, the designated homerow key of each group of keys is then ergonomically adjusted to it's new position, while keeping the geometry of the group intact. This keeps all of the keys within each group in their original geometrical relationships with each other and their assigned homerow key. In this manner, the improved keyboard then becomes a new geometric placement of these homekey-based groups. An example of this, using the three main rows of the standard keyboard with the homerow 44 in the middle, is shown in FIG. 6A. In this illustration, each homekey-based group is distinguished by group-number.

This approach to logical key-grouping is modified only where it would lead to the placement of a non-homerow key directly interfering with the placement of either a homerow key, or a key placed previously in a way designed to avoid interference with the placement of a homerow key. In either case, the homerow key or the previously placed key would keep its position, and the non-homerow key of the group in question would be placed as closely as possible to the position ascribed to it by its standard keyboard finger-assignment, while still approximating the ergonomic adjustment of the homerow.

Figure 6B:
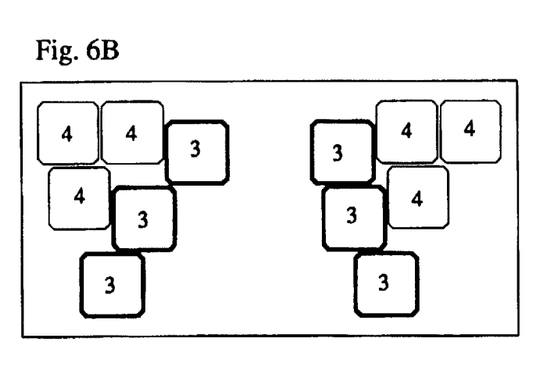
Figure 6C:
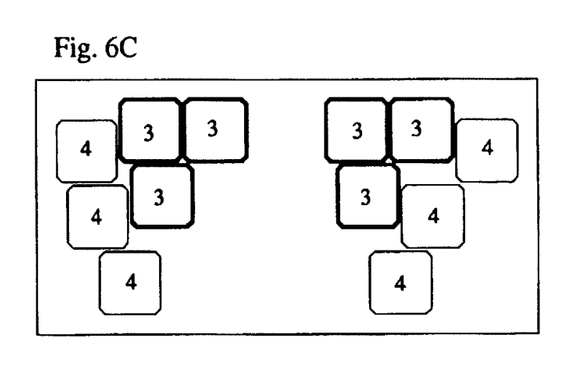

This type of interference is most common when the values of the homerow keys are varied. Different key values create positional interferences. An example of this is illustrated in FIGS. 6B and 6C. In these examples, group number 3 is taken from FIG. 6A and readjusted so that the two homerow keys are not of equal value. It can be seen from comparison that, depending on which of the two values is higher (the outer homerow key in FIG. 6B, the inner homerow key in FIG. 6C), different logical groups may result. This interference is possible between any set of keys, depending on their assigned values, and along with finger assignment, original keyboard geometry, and design intentions, determines the construction of the logical groups.

The limiting of the placement of these key-groups is an important aspect of the ergonomically improved keyboard of the present invention. Depending on the geometry of the original keyboard, whether it be the standard keyboard or some other which is to be so modified, there will exist naturally occurring limits to how far the ergonomic adjustments may be carried without violating the original keyboard geometry. These adjustment parameters are mainly determined by the nature of the original keyboard and the product development goals.

Figure 7:
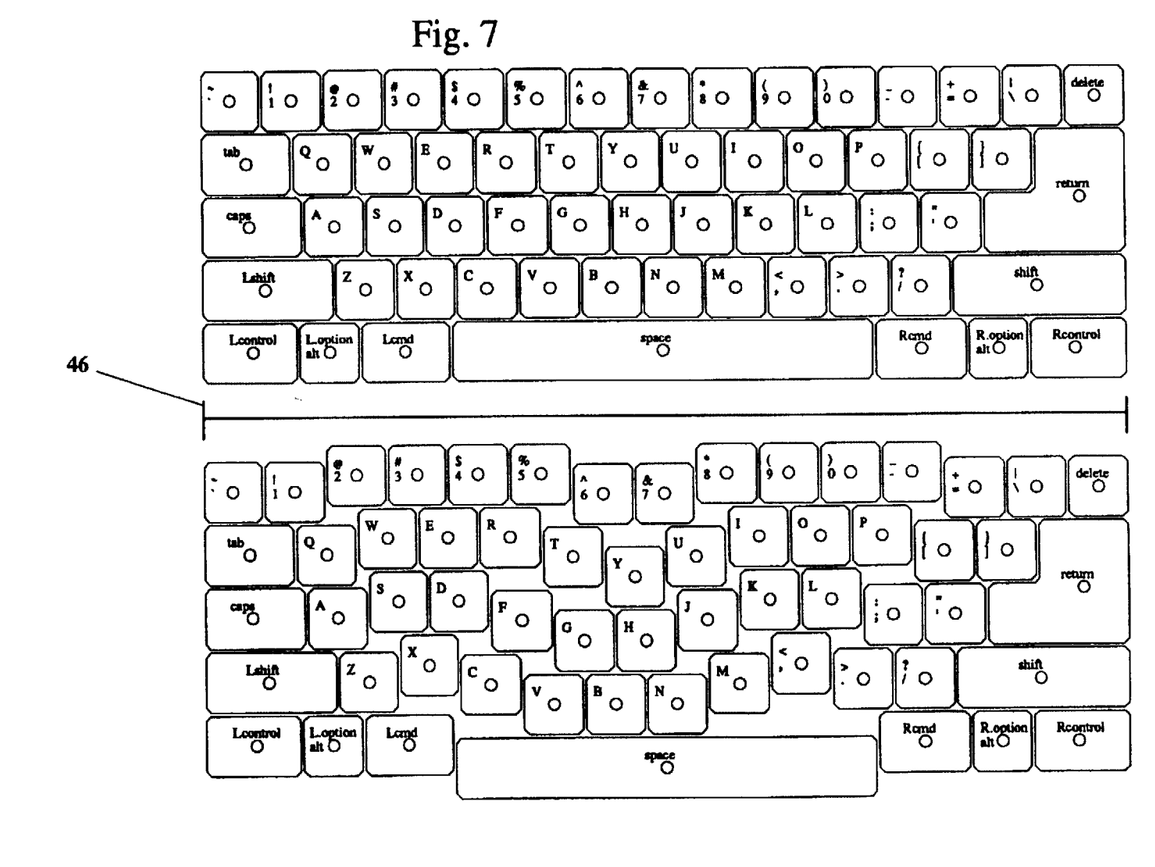
FIG. 7 is a plan view comparing of the overall size of a standard keyboard and a keyboard made in accordance with the present invention.

For example, to most closely follow the original geometry of the standard keyboard while still applying the full range of ergonomic adjustments described above, it is necessary to limit the possible range of group adjustments to vertical movements alone. In this way, very tight orientation with the original geometry is unavoidable, resulting in an ergonomically modified keyboard having no increased width 46 and minimally increased height, as in FIG. 7. Such a keyboard may be fitted virtually anywhere the standard keyboard is already in place.

Other design requirements, such as the separation of hand groups or the addition of a third dimension of curve or depth, would imply their own adjustment parameters to the application of the above ergonomic modification methodology. Nevertheless, there would always be implied limits to this approach to ergonomic modification, the final results always being a compromise between ergonomic perfection and the users pre-existing familiarity with the original keyboard.

Thus the reader will see that the modifications described herein include the solutions to most of the ergonomic deficiencies of the standard keyboard, including limitations of psychological familiarization to existing norms, all in one simple, integrated approach.

Furthermore, this ergonomically improved keyboard has the additional advantages in that it fits the natural finger, hand, wrist, arm, and posture positions of a typist;

it can be easily altered to fit the needs of ergonomically different groups of people;

it is simple to design and low-cost to build;

it makes typing physically and psychologically safer and easier; and rising numbers of typing-related injuries make it evermore needed.

While my above description contains many specificities, these should not be construed as limitations on the scope of the invention, but rather as an exemplification of one preferred embodiment thereof. For example, different standard keyboard definitions can be similarly modified, groups can be made moveable and adjustable by the user, and a theory of typing bio-mechanics need not be used to determine the amount of homerow key adjustment. Additionally, this invention may be applied to keyboards molded to curved surfaces, or using non-alphanumeric keys or designations, chording capabilities, single or multiple-hand designs, or miniaturization.

Accordingly, the scope of the invention should be determined not by the embodiments illustrated, but by the appended claims as interpretted in accordance with applicable laws.

I claim:

1. A keyboard comprising a set of keys having center points, said center points being arranged in a pattern substantially in accordance with the pattern shown in FIG. 2.

* * * * *